INVENTORS
Michael Glowa
Charles A. Ginter

BY DeLio and Montgomery
ATTORNEYS

United States Patent Office 3,488,498
Patented Jan. 6, 1970

3,488,498
COMPARATOR CHARTS USING A
LUMINOUS LINE
Michael Glowa and Charles A. Ginter, Springfield, Vt.,
assignors to Textron, Inc., Providence, R.I., a corporation of Delaware
Filed Mar. 13, 1968, Ser. No. 712,861
Int. Cl. G01d 7/06, 13/20
U.S. Cl. 250—72                                    12 Claims

ABSTRACT OF THE DISCLOSURE

This invention relates to optical apparatus for the inspection of structural parts. In particular, this invention is directed to a chart having at least one luminous line on one surface thereof.

---

This invention relates to optical apparatus for the inspection and measurement of structural parts and objects and more particularly to an improved comparator chart using luminous lines for inspecting dimensions of said parts and objects.

In well known types of optical comparators, a beam of light is directed on a part to be inspected. A projecting and magnifying lens system and a cooperating mirror provide a magnified shadow of the part on a viewing screen of translucent material, such as a sheet of ground glass. The part passes inspection when the outline of the magnified shadow and the master chart outline coincide in a predetermined manner. The prior art has disclosed many types of masks suitable for inspecting a projected part. For example, such a mask is disclosed in U.S. Patent No. 3,358,557 assigned to the assignee of this invention.

Presently, the prior art charts use dark opaque materials so that with back lighting from the viewing screen they stand out boldly in high contrast. However, should a projected image exceed its dimensions, causing part or all of the shadow to cover the inspection line, the line is lost and very hard to see in the shadow area. Therefore, its use as a set line is hampered, resulting in the possible loss of setting accuracy as well as eyestrain.

In view of the foregoing difficulties with presently available charts, a new type of chart for comparators was desirable. The new chart must not only reduce operator fatigue or eyestrain but must also provide more accurate indications when tolerance limits have been met.

To accomplish the above, this invention has provided a new and improved chart having formed on one surface thereof at least one luminous but opaque inspection line.

Accordingly, it is an object of this invention to provide a new and improved comparator chart.

Another object of this invention is to provide a new and improved chart outline which is luminous, such that it may be seen even in the shadow area of an image of a part being inspected.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

For a fuller understanding of the invention, reference is had to the following description taken in connection with the accompanying drawings, in which.

Figure 1:
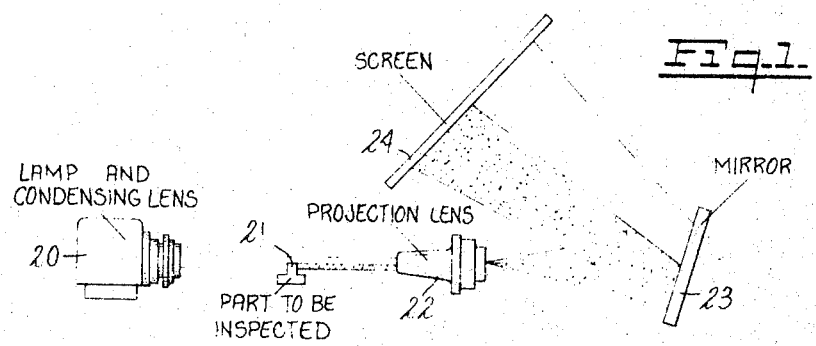
FIG. 1 is a schematic diagram of the main parts of an optical comparator arranged for operation with the chart of this invention.

Referring to FIG. 1, there is shown a comparator system for displaying an enlarged or magnified image of the contour of the work or part to be inspected. A parallel beam of light provided by the combination of the lamp and condensing lens at 20 is directed at a part which is held by a fixture (not shown). The placement of the part 21 outline in the parallel light beam causes a shadow or outline to be projected. This outline is then magnified by a projection lens and magnifying lens system shown at 22 which, in turn, throws a magnified shadow on a mirror 23 inclined so as to cause the image to be projected on a screen 24. This screen is of a translucent material, such that an operator viewing the screen is able to see shadow and light areas.

Figure 2:
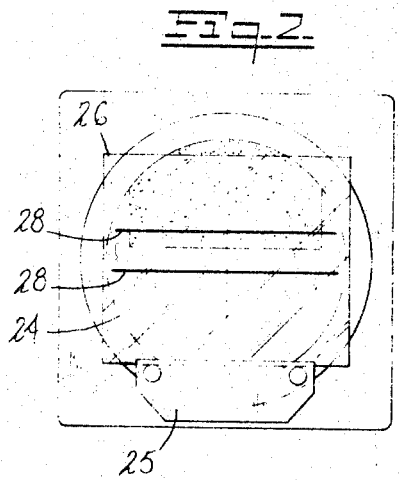
FIG. 2 is a plan view of an optical comparator screen and means for mounting a chart according to the invention adjacent the screen.

In FIG. 2 there is shown a diagram of the screen 24 and a rail 25 for holding a chart 26 according to the invention. The chart 26 is of a translucent material, such as ground glass, plastic, clear glass, etc., having two luminous but opaque lines 28. The shadow area, as shown in the screen through chart 26, represents the outline or image of the part to be inspected or gaged.

As used herein, the term "luminous" defines a material which emits or seems to emit a steady suffused light which is reflected or produced from within. The term as used herein, includes reflecting substances as well as luminescent materials such as fluorescent and phosphorescent materials. A description of suitable luminescent materials as well as phosphorescent materials either organic or inorganic, may be had by reference to the Encyclopedia of Chemistry, 2d Ed., Reinhold Publishing Corp., New York, copyright 1966, editors, George L. Clark and Gessner G. Hawley. The text of this encyclopaedia referred to is made a part of the disclosure herein by reference thereto.

Since there is usually light glare present with the use of a comparator, a luminous line 28 will cause only enough of that light to be reflected toward the eyes of an operator so that, when it is covered by the shadow, it is very readily seen. By the same token, however, the line is of such a thickness as to be opaque to back lighting, that is, the lighting from the comparator apparatus itself, so that it can only be seen as black and/or white when beyond the area of the shadow.

Materials which are adaptable for use as a luminous line have been mentioned previously with reference to the Encyclopedia of Chemistry, and include aluminum, nickel and zinc sulphide having some copper therein. It is to be understood that, if desired, a fluorescent or other type material excited by ultra violet light or other sources of energy may also be used in observing the lines 28.

Methods which may be used to construct the lines of this invention include evaporation techniques which will deposit metal upon glass. In addition, chemical electroless metal plating techniques may also be used to deposit metal on glass.

Figure 3:
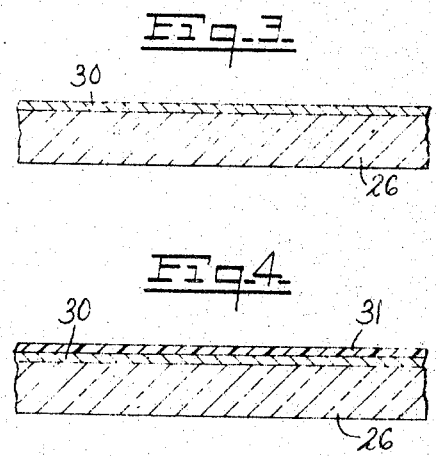
FIGS. 3–6 show the steps of a method for making the optical chart according to this invention.
Figure 4:
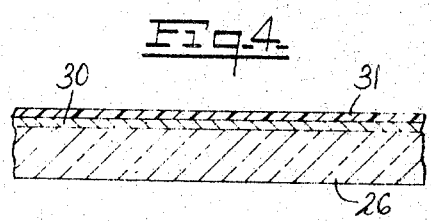
Figure 5:
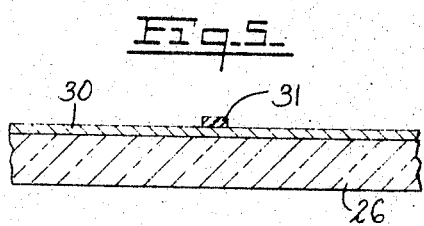

FIGS. 3–6 illustrate a description of the first method, wherein vacuum evaporation technique is utilized. The translucent glass chart shown at 26, FIG. 3, is first covered with a thin film of aluminum or nickel 30. Thereafter, as shown in FIG. 4, a layer of photosensitive emulsion 31 is placed thereon. As illustrated in FIG. 5, the emulsion 31 is then exposed and developed, acting as a resist to protect the underlying film. Subsequently, the portion of the film which was exposed is etched away by the use of conventional printed circuit techniques.

Figure 6:
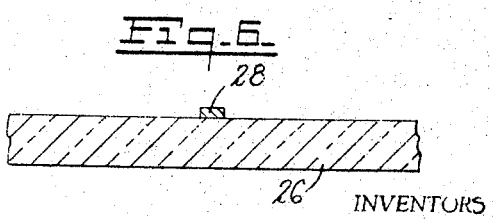

FIG. 6 illustrates the end product, wherein the line 28 remains on the chart 26. The line 28 may be of any thickness, from .001 inch or less, depending on the material, and still remain opaque from any back light.

It will therefore be seen that the chart according to this invention, is easily constructed, using known techniques.

Accordingly, the objects set forth above, among those made apparent from the preceding description, are efficiently attained and since certain changes may be made in the above article without departing from the spirit and scope of the invention, it is intended that all matter contained in the foregoing description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A chart for use with an optical comparator used to inspect structural parts, the chart comprising a sheet of translucent material having formed on one surface thereof at least one luminous but opaque inspection line, such that the line can easily be seen against a shadow background.

2. A chart according to claim 1, in which the line is of fluorescent material.

3. A chart according to claim 1, in which the line is of a reflecting material.

4. A chart according to claim 1, in which the line is of a phosphorescent material.

5. An apparatus for the inspection and measurement of structural parts, comprising a translucent screen, means for supporting a part to be inspected, means for projecting an image indicative of the shape of the part on the translucent screen, and a translucent chart positioned in front of the screen, said chart having at least one luminous but opaque line on a surface thereof, such that the line can easily be seen against a shadow background.

6. An apparatus according to claim 5, in which the line is of fluorescent material.

7. An apparatus according to claim 5, in which the line is of a reflecting material.

8. An apparatus according to claim 5, in which the line is of phosphorescent material.

9. A method for preparing a comparator chart used to inspect structural parts, comprising
   (a) coating a sheet of translucent material on one side with a film of luminous material which is sufficiently thick to be opaque,
   (b) applying a layer of photosensitive emulsion over said film,
   (c) exposing and developing a portion of said layer of photosensitive emulsion so as to leave at least one inspection line thereon unexposed, and
   (d) etching away said exposed and developed portion of said layer of photosensitive emulsion and of said film of luminous material so as to leave said inspection line consisting of a film of luminous material.

10. The method of claim 9, further comprising removing the unexposed layer of photosensitive emulsion on said inspection line so as to leave the underlying film of luminous material unexposed.

11. The method of claim 9, wherein the luminous material is selected from the class consisting of reflecting material, phosphorescent material and fluorescent material.

12. The method of claim 9, wherein the luminous material is selected from the class consisting of zinc sulphide, aluminum and nickel.

References Cited

UNITED STATES PATENTS

| | | | |
|---|---|---|---|
| 1,302,353 | 4/1919 | Friedrich | 250—72 X |
| 2,780,956 | 2/1957 | Fuller et al. | 356—165 |
| 3,358,557 | 12/1967 | Welch | 356—165 |

RALPH G. NILSON, Primary Examiner

D. L. WILLIS, Assistant Examiner

U.S. Cl. X.R.

250—71; 356—165